US012147981B2

(12) United States Patent
Pickering

(10) Patent No.: US 12,147,981 B2
(45) Date of Patent: Nov. 19, 2024

(54) METHODS AND SYSTEMS FOR GENERATING A UNIQUE SIGNATURE BASED ON USER DEVICE MOVEMENTS IN A THREE-DIMENSIONAL SPACE

(71) Applicant: Worldpay, LLC, Symmes Township, OH (US)

(72) Inventor: Daren L. Pickering, Rugby (GB)

(73) Assignee: Worldpay, LLC, Symmes Township, OH (US)

( * ) Notice: Subject to any disclaimer, the term of this patent is extended or adjusted under 35 U.S.C. 154(b) by 701 days.

(21) Appl. No.: 16/413,330

(22) Filed: May 15, 2019

(65) Prior Publication Data

US 2020/0364716 A1 Nov. 19, 2020

(51) Int. Cl.

| | |
|---|---|
| ***G06Q 20/40*** | (2012.01) |
| ***G06F 3/01*** | (2006.01) |
| ***G06F 21/34*** | (2013.01) |
| ***G06F 21/44*** | (2013.01) |
| ***G06N 20/00*** | (2019.01) |
| ***G06Q 20/20*** | (2012.01) |
| ***G06Q 20/38*** | (2012.01) |
| ***H04W 12/30*** | (2021.01) |
| *H04W 12/63* | (2021.01) |

(52) U.S. Cl.

CPC ......... *G06Q 20/4014* (2013.01); *G06F 3/017* (2013.01); *G06F 21/34* (2013.01); *G06F 21/44* (2013.01); *G06N 20/00* (2019.01); *G06Q 20/206* (2013.01); *G06Q 20/3825* (2013.01); *H04W 12/30* (2021.01); *G06F 2218/16* (2023.01); *H04W 12/63* (2021.01)

(58) Field of Classification Search

CPC ..... G06Q 20/00-425; H04W 12/00-80; G06F 3/00-167; G06F 21/00-88

See application file for complete search history.

(56) References Cited

U.S. PATENT DOCUMENTS

| | | | | |
|---|---|---|---|---|
| 8,761,809 | B2 | 6/2014 | Faith et al. | |
| 2012/0164978 | A1 | 6/2012 | Conti et al. | |
| 2012/0306745 | A1* | 12/2012 | Moore | G06F 3/04842 345/158 |

(Continued)

OTHER PUBLICATIONS

International Search Report and Written Opinion issued in International Application No. PCT/US2020/030606, issued Aug. 19, 2020. (13 pages).

*Primary Examiner* — Mohammad A. Nilforoush

(74) *Attorney, Agent, or Firm* — Bookoff McAndrews, PLLC

(57) ABSTRACT

Systems and methods are disclosed for device movement-based authentication. One method comprises receiving contextual data from one or more sensors of a user device and determining a device movement pattern based on the received contextual data. The determined device movement pattern is compared with a device movement-based signature associated with a user of the user device. If the determined device movement pattern matches the device-movement based signature within a predetermined threshold, the user is authenticated for an electronic transaction. If the determined device movement pattern does not match the device-movement based signature, a notification indicating authentication failure is sent to the user device.

19 Claims, 6 Drawing Sheets

500

RECEIVE CONTEXTUAL DATA FROM ONE OR MORE SENSORS — 510

DETERMINE A DEVICE MOVEMENT PATTERN BASED ON THE RECEIVED CONTEXTUAL DATA — 515

DETERMINE WHETHER THE DETERMINED DEVICE MOVEMENT PATTERN MATCHES A DEVICE MOVEMENT-BASED SIGNATURE — 520

MATCH — 525

NO → AUTHENTICATION FAILURE — 535

YES → AUTHENTICATE THE USER FOR ELECTRONIC TRANSACTION — 530

(56) References Cited

U.S. PATENT DOCUMENTS

| | | | | |
|---|---|---|---|---|
| 2013/0102283 | A1* | 4/2013 | Lau | G06Q 30/0269 455/411 |
| 2014/0333524 | A1 | 11/2014 | Liu et al. | |
| 2016/0088474 | A1 | 3/2016 | Smith et al. | |
| 2016/0155111 | A1* | 6/2016 | Arnald | G07F 7/0846 705/41 |
| 2016/0226865 | A1 | 8/2016 | Chen et al. | |
| 2017/0227995 | A1 | 8/2017 | Lee et al. | |
| 2018/0053187 | A1 | 2/2018 | Borkar | |
| 2019/0332758 | A1* | 10/2019 | Yin | G06V 40/193 |

* cited by examiner

METHODS AND SYSTEMS FOR GENERATING A UNIQUE SIGNATURE BASED ON USER DEVICE MOVEMENTS IN A THREE-DIMENSIONAL SPACE

TECHNICAL FIELD

The present disclosure relates to methods and systems for device movement-based authentication. More particularly, the present disclosure relates methods and systems for generating a device movement-based signature for a user. The present disclosure further discusses methods and systems for authenticating the user for an electronic transaction based on verifying a movement pattern of the user device against the device movement-based signature.

BACKGROUND

Traditionally, merchants and other store owners have point of sale (POS) terminals that can accept check or payment card from consumers for goods and services. Such POS systems may include personal identification number (PIN) pads at which a consumer may enter payment or user authentication information (e.g., PIN, card verification value (CVV), passcode, answer to a secret question, etc.) in order to complete payment processing requests for purchases. Increasingly, merchants and store owners interact with consumers using consumer devices (i.e., user devices), such as mobile phones, tablets, wearable devices, etc. For instance, using a mobile phone, a consumer may access a merchant web site or a mobile application associated with the merchant, and make purchases remotely over the web. A consumer may also make payments at a brick-and-mortar store using a digital wallet installed on the mobile phone, for example by "tapping" the mobile phone on a POS terminal. Consumers may then input authentication information using input devices, such as, e.g., a PIN pad or a keyboard displayed on the mobile phone, etc.

Authentication data that can be entered via PIN pads and keyboards may comprise a sequence of alphanumeric characters (and special symbols in some cases). Authentication data of this nature may be easily detected by an observer nearby the user entering the authentication data, or may be stolen by a data thief hacking into a computing system storing such data. Subsequently, entry or provision of such authentication data may be replicated by simply entering the stolen data using PIN pads, keyboards, etc.

Accordingly, there is a need for improving security in transactions involving and/or requiring entry or provision of authentication data. More particularly, there is a need for systems and methods that allow users to provide authentication data in a theft-resistant and unique manner, such that user's entry or provision of authentication data cannot be replicated successfully by an unauthorized party.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

One embodiment provides a computer-implemented method for device movement-based authentication, comprising: receiving contextual data from one or more sensors of a user device; determining a device movement pattern based on the received contextual data; determining whether the determined device movement pattern matches a device movement-based signature associated with a user of the user device; upon determining that the determined device movement pattern matches the device movement-based signature within a predetermined threshold, authenticating the user for an electronic transaction; and upon determining that the determined device movement pattern does not match the device movement signature, transmitting a notification indicating authentication failure to the user device.

One embodiment provides a system for device movement-based authentication. The system may comprise one or more processors; and a non-transitory computer readable medium storing instructions which, when executed by the one or more processors, cause the one or more processors to perform a method comprising: receiving contextual data from one or more sensors of a user device; determining a device movement pattern based on the received contextual data; determining whether the determined device movement pattern matches a device movement-based signature associated with a user of the user device; upon determining that the determined device movement pattern matches the device movement-based signature within a predetermined threshold, authenticating the user for an electronic transaction; and upon determining that the determined device movement pattern does not match the device movement signature, transmitting a notification indicating authentication failure to the user device.

One embodiment provides a non-transitory computer readable medium for device movement-based authentication. The non-transitory computer readable medium may store instructions that, when executed by one or more processors, cause the one or more processors to perform a method comprising: receiving contextual data from one or more sensors of a user device; determining a device movement pattern based on the received contextual data; determining whether the determined device movement pattern matches a device movement-based signature associated with a user of the user device; upon determining that the determined device movement pattern matches the device movement-based signature within a predetermined threshold, authenticating the user for an electronic transaction; and upon determining that the determined device movement pattern does not match the device movement signature, transmitting a notification indicating authentication failure to the user device.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
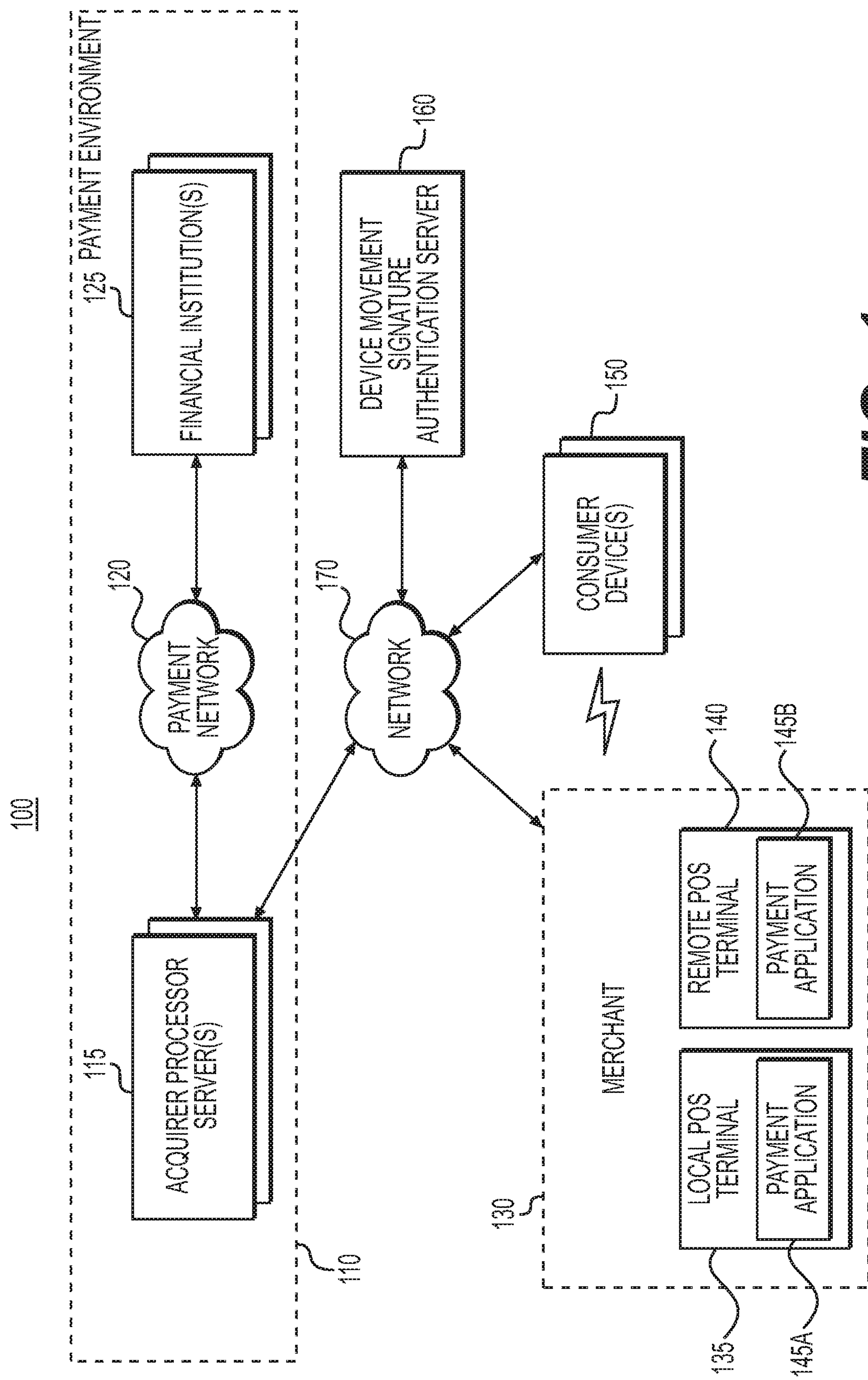
FIG. 1 depicts a block diagram of an electronic payment transaction processing system, according to one aspect of the present disclosure.

The present disclosure relates to methods and systems for device movement-based authentication. More particularly, the present disclosure relates methods and systems for generating a device movement-based signature to authenticate a user. The present disclosure further discusses methods and systems for authenticating the user for one or more electronic transactions based on verifying a movement pattern of the user device against the device movement-based signature.

The subject matter of the present disclosure will now be described more fully with reference to the accompanying drawings that show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

For simplicity, the description that follows will be provided by reference to a "payment vehicle," "transaction vehicle," or a "payment card," which generally refers to any type of financial alternative to cash. As is to be clear to those skilled in the art, no aspect of the present disclosure is specifically limited to a specific type of payment vehicle or payment card. Therefore, it is intended that the following description encompasses the use of the present disclosure with many other forms of financial alternatives to cash, including credit cards, debit cards, smart cards, chip-based payment cards, single-use cards, prepaid cards, electronic currency (such as might be provided through a cellular telephone or personal digital assistant), and the like. Payment vehicles or payment cards can be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, prepaid or stored-value cards, electronic benefit transfer cards, a "virtual" card (e.g., in the form of a display on a smart phone), or any other like financial transaction instrument. In any event, the payment vehicles described herein communicate account information (e.g., an account number or other account indicative information) during a purchase event and/or payment or credit transaction.

Traditionally, merchants and other store owners may accept payment/user authentication data (e.g., PIN, CVV, passcode, answer to a secret question, etc.) via point of sale (POS) devices that have buttons arranged in a standardized format of alphanumeric characters. The standardized format may be seen in standard PIN Pad and keyboard layouts. Authentication data that can be entered via PIN pads and keyboards comprise a sequence of alphanumeric characters (and special symbols in some cases). Authentication data of this nature may be easily detected by an observer, or may be stolen by a data thief hacking into a computer system storing such data. Entry or provision of such authentication data may be replicated by simply entering the stolen data using PIN pads, keyboards, etc.

The disclosed systems and methods provide an improvement to the current problem of easily-replicable authentication data, by providing a device movement-based authentication technique. There are three possible ways of proving one's identity: by means of something that one possesses (e.g., a key to one's vehicle, a document, a card, a badge, etc.), by means of something that one knows (e.g., a name, a secret, a password, a PIN, etc.), or by means of something that one is (e.g., a fingerprint, a face, etc.). In one embodiment, the authentication method disclosed herein may utilize a combination of i) the means of something that one knows and ii) the means of something that one is, for a more robust and secure authentication.

In one aspect, the present embodiment may be implemented in a payment authentication environment in which a user may be prompted on a user device to make a signature move for authentication. In response to the prompt, the user may make a signature move by making a plurality of, or a series of hand movements, while holding the user device in the moving hand. In other words, the user may make the signature move by moving the user device in a pattern known to the user. Using contextual data captured during the signature move by one or more sensors of the user device, a determination is made whether the signature move matches a device movement-based signature that was previously set up by the user (i.e., a genuine reference signature). If the signature move matches the device movement-based signature, the user is authenticated to proceed with the electronic payment transaction.

Even if a rogue party knows of the movement patterns associated with the device movement-based signature and closely mimics the movement patterns for authentication, a successful replication may be impossible due to varying physical dimensions between individuals, and because a specific signing pattern of a user may be unique and very difficult for others to imitate. Further, moving a user device in a specific pattern for authentication may be convenient and less time consuming for the user, compared to typing in a number of alphanumeric characters. The device movement-based authentication may be used in conjunction with other types of biometric authentication methods, such as face recognition, fingerprint recognition, etc., to facilitate a multifactor authentication in one, seamless process. The combination of biometrics authentication and device movement-based authentication (i.e., behaviometrics) creates a robust authentication system applicable to a wide range of contexts.

Referring now to the appended drawings, FIG. 1 depicts a block diagram of an electronic payment transaction processing system 100, according to one aspect of the present disclosure. In general, FIG. 1 depicts a payment environment 110, a merchant 130, a device movement signature authentication server 160, and consumer device(s) 150, all connected via network 170. Network 170 may include the Internet, but may also include other networks such as a corporate WAN, cellular network, satellite network, or combination thereof, for example. The network 170 may be employed to enable data communications between the various entities illustrated in FIG. 1.

In an electronic payment transaction processing system 100 of FIG. 1, a consumer (i.e., a user), during a checkout process with a merchant 130, may make an electronic payment using a local point of sale (POS) terminal 135. Local POS terminal 135 may comprise a computing system consistent with, or similar to, that depicted in FIG. 6, and may handle face-to-face or in-person transactions. Face-to-face or in-person transactions may refer to local transactions taking place between a merchant 130 and a consumer present in a same venue or location, or in close physical proximity to each other (e.g., during a meeting between the merchant 130 and the consumer, at a brick-and-mortar store of the merchant 130, etc.). In one embodiment, local POS terminal 135 may be a mobile device of the merchant 130 (or a party selling goods/services to a consumer), the mobile device comprising a computing system consistent with or similar to that depicted in FIG. 6. The term "mobile device" used herein may refer to a smart phone, a table, a laptop, a smart watch, a wearable device, a gaming device, a handheld computer, a portable media player, or any other mobile or portable computing device. Local POS terminal 135 may be configured to leverage an external card reader peripheral device (e.g., a magnetic card reader, a contactless reader, a contactless near field communication (NFC) reader, etc.) to become an ad hoc POS platform, using payment application 145A. In other embodiments, local POS terminal 135 may be a POS terminal located at a brick-and-mortar store of the merchant, using payment application 145A to process electronic payment transactions.

Merchant 130 may also comprise a remote POS terminal 140. The remote POS terminal 140 may comprise a server consistent with or similar to the computing system depicted in FIG. 6, and may handle transactions that occur over a network 170 with consumer devices 150. The consumer device 150 may include, but may not be limited to, a virtual reality (VR) consumer product (e.g., a VR headset, VR or augmented reality (AR) eyewear, a VR immersive system, etc.), a smartphone, a mobile phone, a tablet computer, a laptop, a portable computer, a desktop computer, a smart watch, a wearable device, etc. The remote POS terminal 140 may be in communication with the consumer devices 150 over the network 170 and may provide an electronic payment interface to the consumer devices 150, using payment application 145B. The electronic payment interface may be provided in a variety of forms. In one embodiment, the electronic payment interface may be a web page where a user of the consumer device 150 can provide payment vehicle information as well as the corresponding authentication data (e.g., PIN, password, CVV, answer to a secret question, signature move, etc.). In another embodiment, the electronic payment interface may be a virtual reality environment where a user can provide a payment vehicle (or payment vehicle information) as well as the corresponding authentication data. In yet another embodiment, the electronic payment interface may be a web-based application through which a user can provide a payment vehicle (or payment vehicle information) as well as the corresponding authentication data. In yet another embodiment, the electronic payment interface may provide an installable mobile application to the consumer devices 150, so that a consumer may use the mobile application to access an electronic payment interface to provide a payment vehicle (or payment vehicle information) as well as the corresponding authentication data.

The electronic payment transaction processing system 100 may also comprise a device movement signature authentication server 160. As will be discussed in greater detail below, the device movement signature authentication server 160 may process device movement-based authentication data provided by consumers in their respective environments. For example, when a consumer provides a payment vehicle at a POS terminal (i.e., local POS terminal 135 or remote POS terminal 140), the POS terminal may request authentication data from the consumer. Instead of using a PIN pad or a keyboard, the consumer may provide authentication data in the form of a signature move, via a device movement-based authentication data entry interface. The device movement-based authentication data entry interface may be enabled by the device movement signature authentication server 160 and the consumer device 150. By using the device movement-based authentication data entry interface, the likelihood of a successful entry/provision of authentication data by an unauthorized party may be substantially reduced. The device movement signature authentication server 160 may comprise a computing system consistent with, or similar to, that depicted in FIG. 6. The device movement signature authentication server 160 may comprise a data storage where one or more device movement-based signatures associated with consumers (may also be referred to as "genuine device movement-based signatures" or "genuine reference signatures") are stored. The device movement signature authentication server 160 may enable consumers to initially set up their device movement-based signatures using the device movement-based authentication data entry interface. Each device movement-based signature may comprise a collection of motion signals derived from contextual data provided by one or more sensors of the consumer device 150, the set of motion signals being representative of the device movement pattern associated with the device movement-based signature. The device movement-based signatures may be stored in a data storage of the device movement signature authentication server 160 as genuine reference signatures, and may later be compared with signature moves provided by the consumers for payment/user authentication.

Because merchant 130 generally can use a bank or financial institution that is different from that of the consumer, an acquirer processor server 115 may handle the electronic payment transactions between the financial institution of the consumer and that of the merchant 130. Upon receiving a payment vehicle (or payment vehicle information) and the corresponding authentication data, the POS terminal (i.e., local POS terminal 135 or remote POS terminal 140) may send an electronic payment authorization request by way of the network 170 to an acquirer processor server 115. Acquirer processor server 115 may then request, by way of payment network 120, an electronic transfer of funds to the financial institution 125 associated with the merchant 130.

Figure 6:
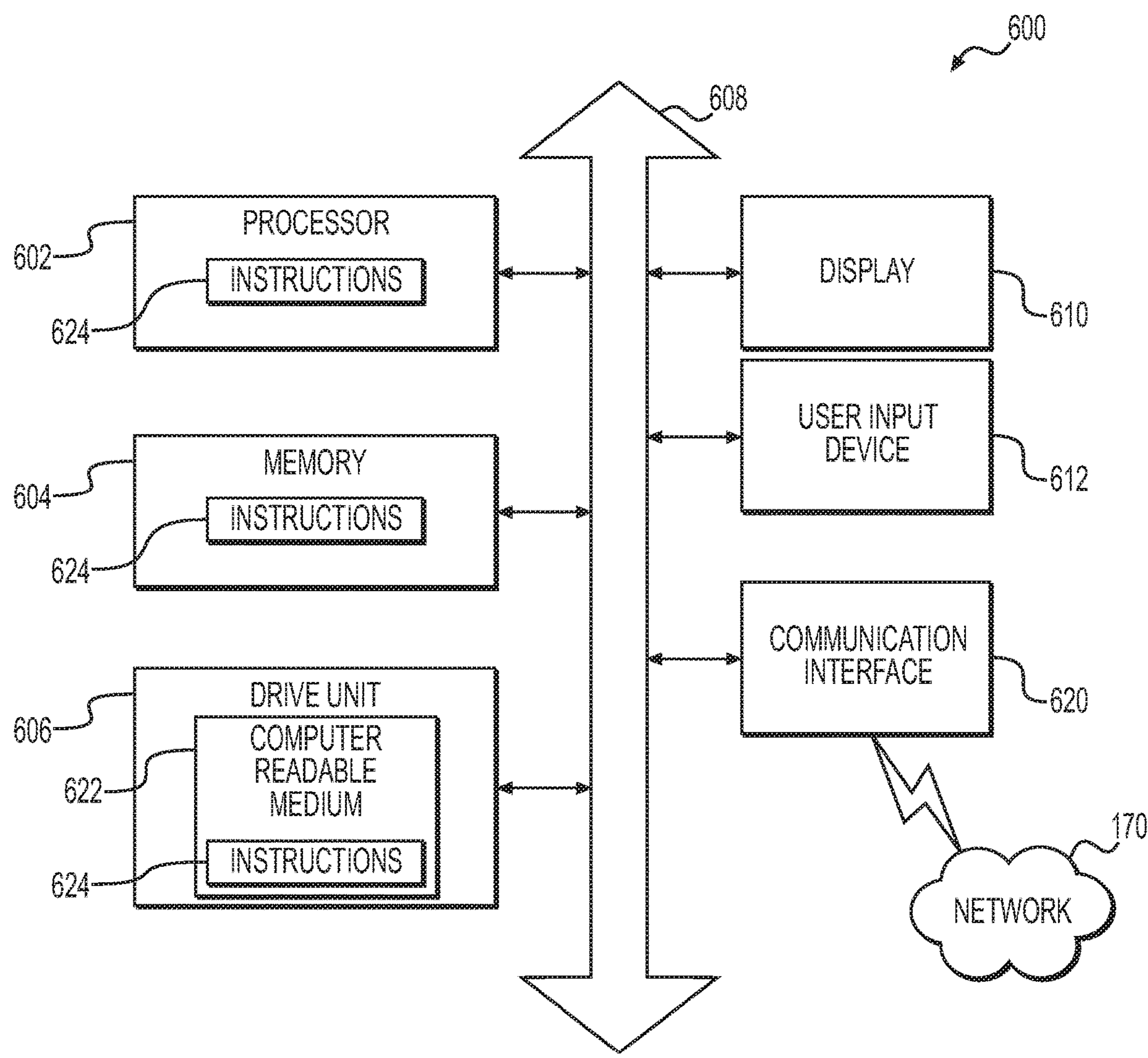
FIG. 6 illustrates an implementation of a general computer system that may execute techniques presented herein.

It should be noted that, although local POS terminal 135, remote POS terminal 140, device movement signature authentication server 160, and consumer device 150 are shown as separate entities in FIG. 1, all or a portion of these components (and the steps performed thereof) may be implemented in a single computing device consistent with or similar to that depicted in FIG. 6. For example, in one embodiment, device movement signature authentication server 160 and consumer device 150 may be implemented on a single computing device. In another embodiment, device movement signature authentication server 160 and a local POS terminal 135 may be implemented on a single computing device. In yet another embodiment, device movement signature authentication server 160 and a remote POS terminal 140 may be implemented on a single computing device. In yet another embodiment, local POS terminal 135, remote POS terminal 140, device movement signature authentication server 160, and consumer device 150 may indeed be implemented separately on their respective computing devices. The configurations specifically discussed herein regarding the arrangement of the components depicted in FIG. 1 are merely exemplary, and it would be obvious to a person of ordinary skill in the relevant art that different combinations of components may be implemented on a single or multiple computing devices.

Figure 2:
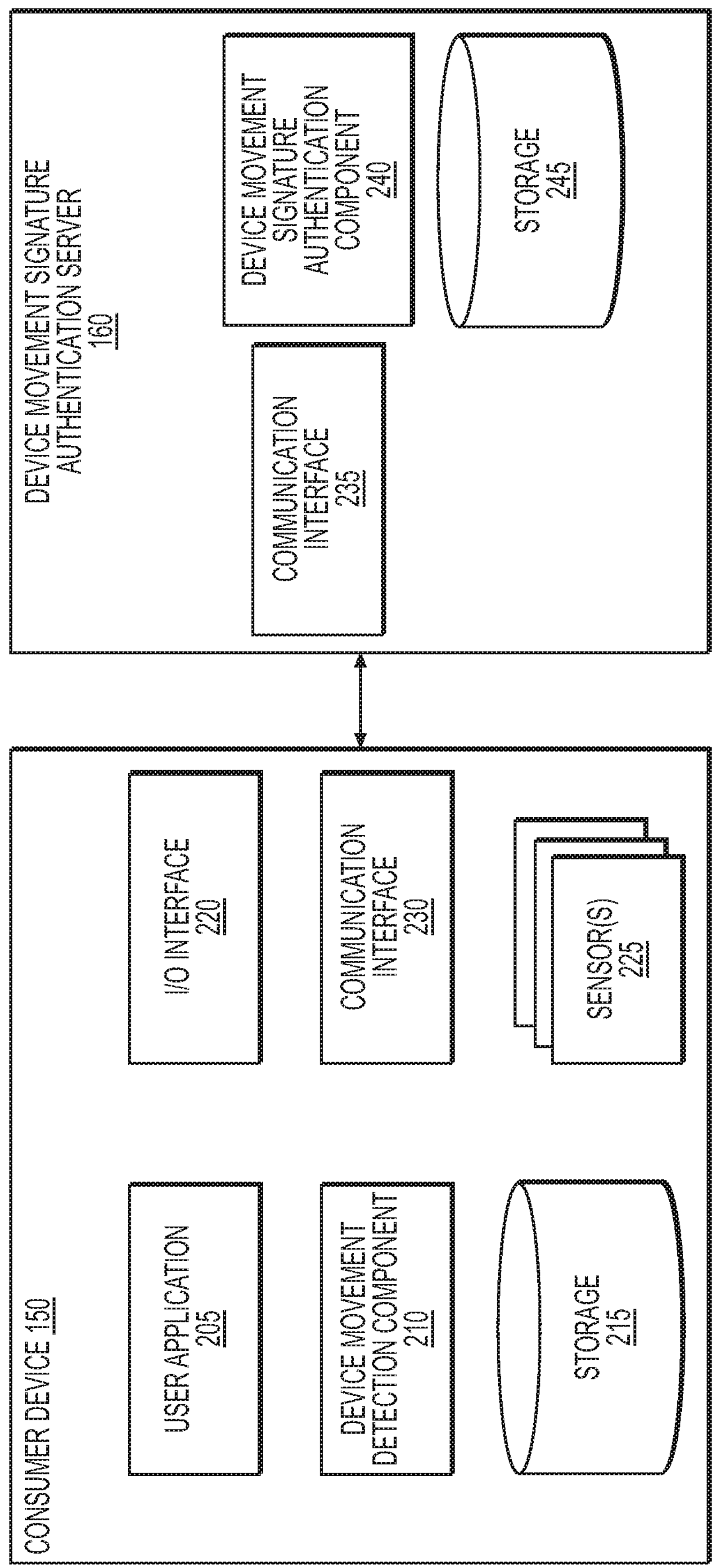
FIG. 2 depicts an exemplary embodiment of a consumer device and a device movement signature authentication server, according to one aspect of the present disclosure.

FIG. 2 depicts an exemplary embodiment of a consumer device 150 and a device movement signature authentication server 160, according to one aspect of the present disclosure. Consumer device 150 may comprise a user application 205, a device movement detection component 210, a storage 215, an input/output (I/O) interface 220, sensor(s) 225, and a communication interface 230. In one embodiment, user application 205 may be configured to carry out an electronic transaction. For example, if the user application 205 is an electronic payment transaction application, the user application 205 may configure the consumer device 150 as an ad hoc POS platform, and may enable the consumer device 150 to present graphical user interface elements to walk a user through a number of steps in an electronic payment transaction, including an authentication step during which the user may provide authentication data such as a signature move and/or user biometrics. As another example, the user application 205 may be a device security application, and the user application 205 may enable a user to unlock the consumer device 150 upon receiving authentication data such as, e.g., a signature move, user biometrics, etc.

Device movement detection component 210 may be configured to collect contextual data using one or more sensors 225 of the consumer device 150, in order to determine a device movement pattern based on the contextual data. The collected contextual data may be stored in the storage 215. Storage 215 may also store a machine learning model trained at, and received from, device movement signature authentication server 160, and device movement-based signatures associated with consumers. Sensor(s) 225 may include global positioning system (GPS) sensors, vision sensors (i.e., cameras), audio sensors (i.e., microphones), light sensors, temperature sensors, radio frequency sensors, direction sensors (i.e., magnetic compasses, magnetometers, gyroscopes), and acceleration sensors (i.e., accelerometers). Device movement detection component 210 may transmit the contextual data to device movement signature authentication server 160 for further processing/analysis, using communication interface 230. I/O interface 220 may provide an interface to connect with peripheral devices such as, for example, display devices, integrated input mechanisms (e.g., keyboards, touch screens, mice, etc.), printers, storage devices, payment input mechanisms (e.g., magnetic card reader devices, smart card readers, optical readers, etc.), speakers and headphones, etc.

Device movement detection component 210 may identify a check point (i.e., a starting check point) at which to begin capturing contextual data using the sensor(s) 225, and may also identify another check point (i.e., an ending check point) at which to halt capturing contextual data using the sensor(s) 225, based on data provided by the user application 205 or the device movement signature authentication server 160. For example, the user application 205 may notify the device movement detection component 210 that the user has been prompted to provide a signature move, or that the user has provided a payment vehicle. In response, the device movement detection component 210 may direct the sensor(s) 225 to start capturing contextual data. The device movement detection component 210 may direct the sensor(s) 225 to stop capturing contextual data upon receiving, from the device movement signature authentication server 160, a notification that the signature move matches the device movement-based signature of the user.

Device movement signature authentication server 160 may comprise a device movement signature authentication component 240, a storage 245, and a communication interface 235. Device movement signature authentication component 240 may receive contextual data from the consumer device 150, and may train a machine learning model (i.e., machine learning classifier) using the contextual data.

During an initial signature setup stage, device movement signature authentication component 240 may receive, from the consumer device 150, contextual data representative of one or more device movement-based signatures associated with a consumer (i.e., genuine reference signatures). Using the contextual data, the device movement signature authentication component 240 may train a machine learning model to identify device movement patterns that match the device movement-based signature associated with the user, and store the trained machine learning model in the storage 245. In some embodiments, device movement signature authentication component 240 may provide the trained machine learning model to the consumer device 150 (i.e. to the device movement detection component 210) for local usage.

During a user authentication stage, device movement signature authentication component 240 may receive, from the consumer device 150, contextual data representative of a signature move associated with the user, determine a device movement pattern based on the contextual data, and determine whether the determined device movement pattern matches the device movement-based signature associated with the user.

It should be noted that, although consumer device 150 and device movement signature authentication server 160 are shown as separate entities in FIG. 2, the device movement signature authentication server 160 may be implemented in the consumer device 150 and the processes performed by the user application 205, device movement detection component 210, and the device movement signature authentication component 240 may all be performed within the consumer device 150. Furthermore, although user application 205 and device movement detection component 210 are shown as separate components (i.e., application logics) within the consumer device 150, these components may actually be a single component (i.e., an application logic) performing all of the functions described with respect to the user application 205 and the device movement detection component 210, and such a single component may be referred to as the user application 205 or the device movement detection component 210. As such, it should be appreciated that the configurations specifically discussed herein regarding the arrangement and/or the division of the components depicted in FIG. 2 are merely exemplary, and different combinations of components may be implemented on a single device (e.g., consumer device 150) or multiple computing devices (e.g., consumer device 150 and device movement signature authentication server 160) to perform the steps described in the present disclosure.

As alluded to above, consumer device 150 may include a user application 205 configured to perform an electronic payment transaction (i.e., an electronic payment transaction application). An electronic payment transaction application may enable a seller or a consumer to use the consumer device 150 as a POS terminal. A consumer device 150 being used as a POS terminal may be referred to as a "mobile terminal" throughout the present disclosure. For example, a user of the consumer device 150 may be presented with a series of graphical user interface screens to complete an electronic payment transaction. As alluded to above in reference to FIG. 2, the user application 205 may enable the consumer device 150 to present the graphical user interface screens, and may also enable transmission of electronic payment transaction-related data to other entities in the electronic payment transaction processing system 100 to process and authorize a payment. Further, during the electronic payment transaction, user application 205 may alert device movement detection component 210 of a starting or an ending check point, depending on the current stage of the electronic payment transaction. In response, the device movement detection component 210 may direct one or more sensors of the user device 110 to begin or halt capturing contextual data.

Figure 3:
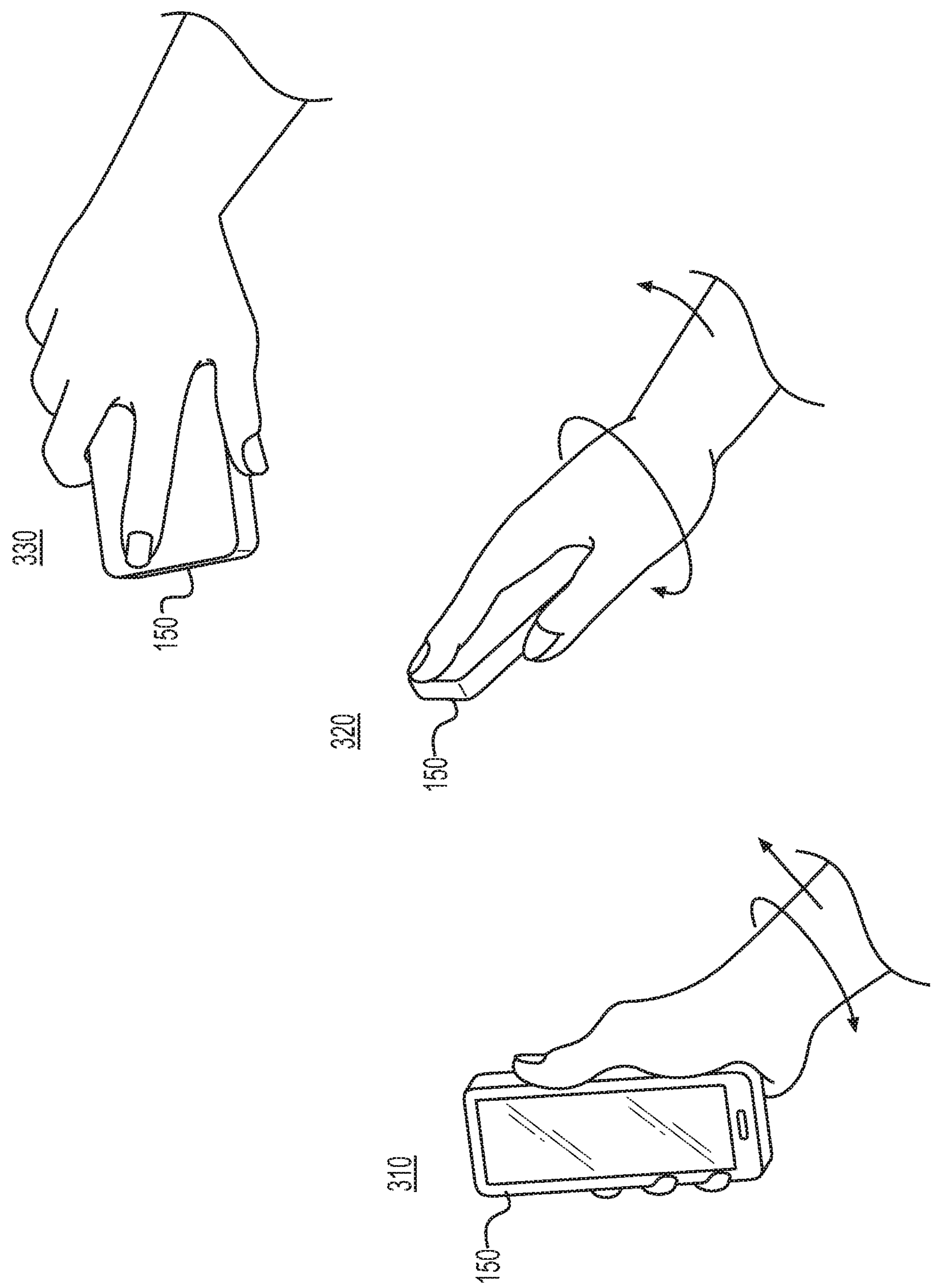
FIG. 3 is an exemplary diagram depicting a user making a signature move, according to one aspect of the present disclosure.

FIG. 3 is an exemplary diagram depicting a user making a signature move, according to one aspect of the present disclosure. As alluded to above, a user may be prompted to make a signature move for user authentication. A user may make a signature move by waving or moving the hand holding the consumer device 150 in a pattern that is known to the user. For example, the signature move may comprise a simple swiping and turning motion, similar to the motion depicted in FIG. 3, or may comprise more complicated motions such as writing/signing the user's name in the air. The signature move may thus involve moving, turning, and/or rotating the consumer device 150 in a three-dimensional (3D) space.

The consumer device 150 may comprise one or more sensors 225 that enable device movement detection component 210 to track the position, acceleration, and/or orientation of the consumer device 150 during a signature move or an initial device movement-based signature setup stage. The one or more sensors of the consumer device 150 may capture contextual data associated with the signature move. The contextual data may comprise vector displacement measurements from an accelerometer (i.e., vector displacement or acceleration of the consumer device 150 in three dimensions, in relation to the X, Y, and Z axis), rotation measurements from a gyroscope and a magnetometer (i.e., the rotation of the consumer device 150 in three dimensions, in relation to the X, Y, and Z axis), longitude and latitude measurements from a global positioning system (GPS) receiver, and any other relevant data describing the position and/or rotation of the consumer device 150.

The contextual data may be used to determine a device movement pattern as a collection of motion signals derived from the contextual data. Each of the motion signals may comprise a time sequence of values captured by the corresponding sensor of the consumer device 150. For example, a motion signal associated with the accelerometer may comprise a plurality of accelerometer readings captured at different times of the signature move. With reference to FIG. 3, the motion signal associated with the accelerometer may comprise a first accelerometer reading captured at 310, a second accelerometer reading captured at 320, and a third accelerometer reading captured at 330, with the readings ordered in sequence. However, this is only exemplary and a motion signal may comprise more than three readings. In some embodiments, each motion signal may be normalized and compressed for machine learning model training purposes.

In one technique, a collection of motions signals that represents a device movement pattern may comprise one or more of: a motion signal associated with an accelerometer, a motion signal associated with a gyroscope, a motion signal associated with a magnetometer, and a motion signal associated with a GPS receiver, with each motion signal comprising a time sequence values captured by the corresponding sensor. However, as alluded to above, the collection of motion signals may include additional or fewer motion signals associated with other sensors of the consumer device 150.

In some embodiments, the collection of motion signals may be associated with rules regarding a minimum number of motion signals to ensure a minimum level of security. For example, simply moving the device one time in one direction may be considered an insufficient collection of motion signals for purposes of authentication. Thus, when the user creates a device movement pattern meant to serve as a device movement-based signature, there may be a minimum number of movements, a required minimum number of types of movements (for example, at least one circular movement, at least one straight line movement, and/or at least one device inversion movement, etc.), a minimum time duration of the device movement-based signature, etc.

In some embodiments, the collection of motion signals may be normalized for authentication purposes. For example, if a user's device movement-based signature comprises moving the device in two loops, normalization may mean that the absolute size of the two loops is not taken into account for authentication purposes. Rather, for authentication it may only be important that the two loops are a predetermined size relative to each other, at least within a predetermined threshold. Normalization may involve relativizing the magnitude of signals received from various sensors, and/or relativizing the magnitude of the various signals received from a single sensor. For example, if a received device movement pattern contains data from an accelerometer, if a motion signal is detected from the accelerometer that is twice the normally expected amplitude for the device movement-based signature (for example, if the user is making the motions faster or slower than normal), the user may still be authenticated if the collection of motion signals consistently reflects the increased amplitude. A limit may be placed on this normalization. For example, a user may be permitted to perform the motion signals faster than the reference device movement-based signature, thus driving up accelerometer or other sensor readings, but may be prohibited from performing the motion signals outside of a predetermined range. Thus, a user may be permitted to perform the motion signals 50% slower or 50% faster than the reference device movement-based signature and still be authenticated, but the authentication may fail if the user performs the device movement pattern outside of this range.

Figure 4:
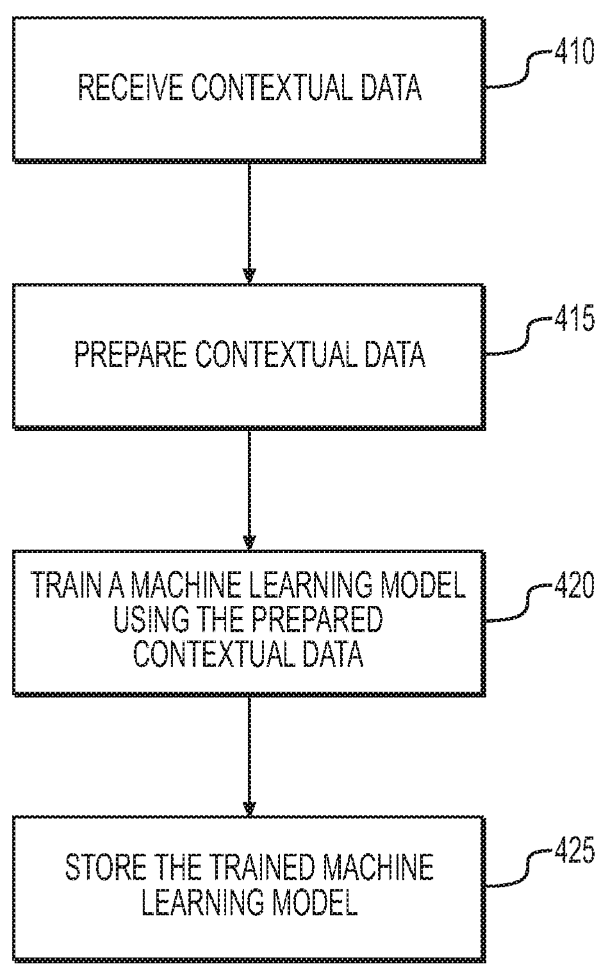
FIG. 4 is a flowchart illustrating an exemplary method of training a machine learning model, according to one aspect of the present disclosure.

FIG. 4 is a flowchart illustrating an exemplary method 400 of training a machine learning model, according to one aspect of the present disclosure. In particular, the steps of method 400 may be performed by the device movement signature authentication component 240. The trained machine learning model may be used to analyze contextual data associated with a signature move, and to determine whether the signature move is genuine (i.e., whether a device movement pattern of the signature move matches the genuine device movement-based signature previously set up by the user).

At step 410, the device movement signature authentication component 240 may receive contextual data from the consumer device 150 (or the device movement detection component 210 thereof). The contextual data may be associated with known genuine and/or forged device-movement based signatures, and may be used as training data. A reason for including contextual data associated with both the genuine and forged signatures may be to train the machine learning model to more accurately distinguish between genuine and forged signatures.

At step 415, the device movement signature authentication component 240 may prepare the received contextual data for model training. Data preparation may involve randomizing or sequencing the ordering of the contextual data, visualizing the contextual data to identify relevant relationships between different variables, identifying any data imbalances, splitting the contextual data into two parts where one part is for training a model and the other part is for validating the trained model, de-duplicating, normalizing, compressing (e.g., Discrete Cosine Transform (DCT), Discrete Fourier Transform (DFT), etc.), extracting features from signatures, labeling instances (e.g., genuine and/or forged), correcting errors in the contextual data, and so on. In some embodiments, data preparation may involve deriving a collection of motion signals that represents a device movement pattern associated with each genuine/forged signature, as discussed above. In some embodiments, lowest dissimilarity scores may be determined between the collection of motion signals associated with each genuine or forged device-movement based signature (i.e., sample signature) and the collections of motions signals associated with a subset of the genuine device-movement based signatures being served as the user's genuine reference signatures, using, for example, dynamic time warping (DTW). Each dissimilarity score may therefore represent the degree of dissimilarity between a motion signal associated with a sample signature and corresponding motion signals associated with the genuine reference signatures. Then, for each genuine or forged device-movement based signature, a vector comprising the corresponding dissimilarly scores may be generated. Each vector may then be labelled as genuine or forged for machine learning model training purposes.

Once the contextual data is prepared (step 415), at step 420, the device movement signature authentication component 240 may train a machine learning model using the prepared contextual data. In one embodiment, the machine learning model may be trained using the vectors generated in step 415. A trained machine learning model could analyze contextual data associated with a signature move to determine whether the signature move is genuine (i.e., the device movement pattern of the signature move matches the movement pattern of a genuine device movement-based signature) or forged (i.e., the device movement pattern of the signature move does not match the movement pattern of a genuine device movement-based signature, or more closely resembles the movement pattern of a forged device movement-based signature). At step 425, the device movement signature authentication component 240 may store the trained machine learning model in a system memory or storage. The trained machine learning model may then be used by the device movement signature authentication component 240 or the device movement detection component 210 to verify the signature move of a user.

It should be noted that, although machine learning may be used to determine whether a device movement pattern of a signature move matches a device movement-based signature associated with a user, a different technique may also be used. For example, a training data set comprising contextual data associated with a plurality of genuine reference signatures (i.e., genuine device movement-based signatures) may be analyzed. Then, each genuine reference signature may be represented as a collection of motions signals derived from the contextual data. Then, a representative genuine reference signature may be derived by taking an average of the collections of motions signals associated with the plurality of genuine reference signatures. The representative genuine reference signature may be stored in a data storage of the device movement signature authentication server 160 and/or the consumer device 150, and may later be compared to a device movement pattern associated with a signature move. For example, if the collection of motion signals representing the device movement pattern of the signature move differs from the representative genuine reference signature by a predefined threshold margin or more, the signature move may be considered to be "non-matching." On the other hand, if the collection of motion signals representing the device movement pattern of the signature move are within the threshold margin from the representative genuine signature, the signature move may be considered to be "matching."

As discussed above, a match between a device movement pattern of a signature move and a device movement-based signature may be determined by using a machine learning model, a representative genuine reference signature, or any other technique suitable for determining a similarity between the device movement pattern of the signature move and the device movement-based signature. Throughout the current disclosure, a match may mean the device movement pattern of the signature move correlating to the device movement-based signature within a predetermined threshold of differences. For example, the predetermined threshold may be a relative threshold (e.g., the motion signals of the signature move being at least 95% similar to the motion signals of the device movement-based signature, the speed of the signature move being at least 50% faster or slower than the speed of the device movement-based signature, etc.) or a dimensional threshold (e.g., the dimensions of the signature move derived from the motion signals being within 2 inches from the dimensions of the device movement-based signature, etc.). The threshold values may not be limited to the specific threshold values discussed herein, but may be any value determined by a user or a computing machine. A match may be determined using one or more predetermined thresholds. In other words, a combination of predetermined thresholds may be used to determine whether the device movement pattern of the signature move matches the device movement-based signature to a sufficient degree in several aspects (i.e., one or more of displacement, acceleration, rotation, longitude, latitude, etc.).

Figure 5:
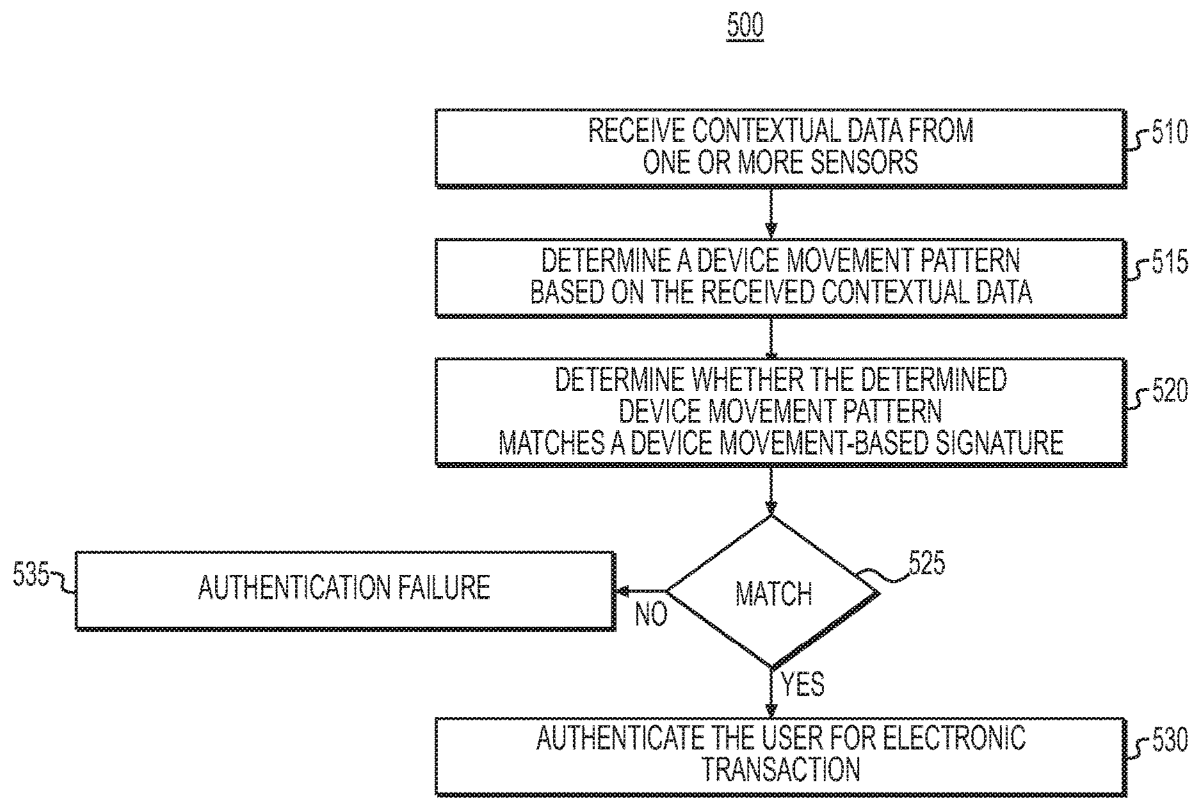
FIG. 5 is a flowchart illustrating an exemplary method of authenticating a user based on device movements.

FIG. 5 depicts a flowchart of an exemplary method of authenticating a user based on device movements. Notably, method 500 may be performed by the device movement signature authentication server 160. Method 500 may be used in any computing environment in which user authentication is needed. In one embodiment, method 500 may be performed in response to a user providing a payment vehicle (or payment vehicle information) via an electronic payment interface. Once the user provides the payment vehicle, a device movement-based authentication data entry interface may be initiated by the device movement signature authentication server 160. In response to a prompt, the user may provide a signature move, and the consumer device 150 may utilize one or more sensors to gather contextual data comprising sensor readings.

At step 510, the device movement signature authentication server 160 may start receiving contextual data from one or more sensors of the consumer device 150. Then, at step 515, the device movement signature authentication server 160 may determine a device movement pattern based on the received contextual data. As discussed above, the device movement pattern may be derived from the contextual data and may comprise (or may be represented by) a collection of motion signals captured by the one or more sensors over a duration of the signature move.

With continuing reference to FIG. 5, at step 520, the device movement signature authentication server 160 may determine whether the determined device movement pattern matches a device movement-based signature associated with the user (i.e., the user of the consumer device 150). As discussed above, the determination may be made based on a trained machine learning model received from the device movement signature authentication component 240. In other embodiments, the determination may be made by comparing the device movement pattern of the signature move with a representative genuine reference signature (i.e., an average of the collections of motions signals associated with the plurality of genuine reference signatures).

At step 525, if the device movement signature authentication server 160 determines that the determined device movement pattern does not match the device movement-based signature, method 500 may proceed to step 535, where the device movement signature authentication server 160 concludes that the authentication failed. The device movement signature authentication server 160 may perform other actions such as, e.g., notifying the user of the authentication failure (i.e., sending an authentication failure notification to a point of sale terminal), notifying the card issuing bank of the authentication failure, terminating the authentication process, etc. Conversely, if the device movement signature authentication server 160 determines that the determined device movement pattern matches the device movement-based signature, method 500 may proceed to step 530, where the device movement signature authentication server 160 may authenticate the user for a login, one or more electronic transactions, etc. For instance, the device movement signature authentication server 160 may direct a corresponding payment application 145A or 145B to send an electronic transaction authorization request to a payment network (e.g., via an acquirer processor server 115). The electronic transaction authorization request may comprise a transaction amount, a primary account number identifier (or a previously-generated token associated with the primary account), a merchant identifier, an issuer identifier, etc.

Additionally, the disclosed device movement-based authentication technique may be used in conjunction with other types of biometric authentication methods, such as face recognition, fingerprint recognition, etc., to facilitate a more robust and secure multifactor authentication. For instance, the consumer device 150 may use one or more sensors, such as, e.g., an image sensor, a fingerprint sensor, etc., to detect one or more features associated with the user of the consumer device 150. The features may include, but may not be limited to, a face, a facial feature, a skin color, a hair color, a fingerprint, etc. The device movement signature authentication server 160 may compare the one or more detected features to corresponding one or more stored features (i.e., reference features) associated with the user. The reference features may be stored in storage 245 of the device movement signature authentication server 160. For instance, a detected face of the user may be compared to a reference face of the user to determine whether they match. One or more other features may also be compared. If the feature comparison results in a match, and the user's signature is also verified using method 500, the device movement signature authentication server 160 authorizes the user for electronic transaction (as in step 530). If any of the two authentication methods (i.e., feature comparison or method 500) results in a non-match, the device movement signature authentication server 160 may conclude that the authentication failed (as in step 535).

For ease of understanding, the following are exemplary scenarios in which the device movement-based authentication technique of the present disclosure may be utilized.

Movement-Based Authentication in a Web Environment

A user logs into a website using a consumer device. After selecting items for purchase, the user moves to the checkout area of the website (i.e., an electronic payment interface) and provides payment account information. The user is then asked to provide authentication data in the form of a signature move using the consumer device. The user makes a signature move by waving or moving the consumer device in a specific pattern. If the movement pattern of the signature move matches that of a genuine signature previously set up by the user, a payment authorization request is transmitted to a payment network for further processing.

Movement-Based Authentication in a Brick-and-Mortar Store

A customer in a store is waiting in line to pay for an item. The customer reaches a point of sale terminal to make a payment. After the item is scanned and a payment vehicle is provided by the customer, the point of sale terminal presents a prompt for the user to provide authentication data. The user makes a signature move with the consumer device, the consumer device being in communication with the POS terminal (e.g., via NFC, bluetooth, web connection, etc.). The consumer device uses one or more sensors to detect the signature move and the detected signature move is compared to a stored genuine signature associated with the customer. Upon successful authentication, a payment authorization request is transmitted to a payment network for further processing.

Movement-Based Authentication in a Virtual Reality (VR) Environment

A user plays a VR game using a VR system comprising a 3D motion sensor, a headset, and a controller equipped with one or more sensors. In response to user's selection of an item for purchase, the user is presented with an in-game electronic payment interface. Upon providing a payment vehicle, the user is prompted to provide authentication data in the form of a signature move using the controller. The controller, using the one or more sensors, captures the device movement pattern. The device movement pattern is compared to a stored genuine signature associated with the user. Upon determining a match, a payment authorization request is transmitted to a payment network for further processing.

Unless specifically stated otherwise, as apparent from the following discussions, it is appreciated that throughout the specification, discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

FIG. 6 illustrates an implementation of a general computer system designated 600. The computer system 600 can include a set of instructions that can be executed to cause the computer system 600 to perform any one or more of the methods or computer based functions disclosed herein. The computer system 600 may operate as a standalone device or may be connected, e.g., using a network, to other computer systems or peripheral devices.

In a networked deployment, the computer system 600 may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 600 can be implemented using electronic devices that provide voice, video, or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), or both. The processor 602 may be a component in a variety of systems. For example, the processor 602 may be part of a standard personal computer or a workstation. The processor 602 may be one or more general processors, digital signal processors, application specific integrated circuits, field programmable gate arrays, servers, networks, digital circuits, analog circuits, combinations thereof, or other now known or later developed devices for analyzing and processing data. The processor 602 may implement a software program, such as code generated manually (i.e., programmed).

The computer system 600 may include a memory 604 that can communicate via a bus 608. The memory 604 may be a main memory, a static memory, or a dynamic memory. The memory 604 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 604 includes a cache or random-access memory for the processor 602. In alternative implementations, the memory 604 is separate from the processor 602, such as a cache memory of a processor, the system memory, or other memory. The memory 604 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 604 is operable to store instructions executable by the processor 602. The functions, acts or tasks illustrated in the figures or described herein may be performed by the programmed processor 602 executing the instructions stored in the memory 604. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 600 may further include a display unit 610, such as a liquid crystal display (LCD), an organic light emitting diode (OLED), a flat panel display, a solid-state display, a cathode ray tube (CRT), a projector, a printer or other now known or later developed display device for outputting determined information. The display 610 may act as an interface for the user to see the functioning of the processor 602, or specifically as an interface with the software stored in the memory 604 or in the drive unit 606.

Additionally or alternatively, the computer system 600 may include an input device 612 configured to allow a user to interact with any of the components of system 600. The input device 612 may be a number pad, a keyboard, or a cursor control device, such as a mouse, or a joystick, touch screen display, remote control, or any other device operative to interact with the computer system 600.

The computer system 600 may also or alternatively include a disk or optical drive unit 606. The disk drive unit 606 may include a computer-readable medium 622 in which one or more sets of instructions 624, e.g. software, can be embedded. Further, the instructions 624 may embody one or more of the methods or logic as described herein. The instructions 624 may reside completely or partially within the memory 604 and/or within the processor 602 during execution by the computer system 600. The memory 604 and the processor 602 also may include computer-readable media as discussed above.

In some systems, a computer-readable medium 622 includes instructions 624 or receives and executes instructions 624 responsive to a propagated signal so that a device connected to a network 170 can communicate voice, video, audio, images, or any other data over the network 170. Further, the instructions 624 may be transmitted or received over the network 170 via a communication port or interface 620, and/or using a bus 608. The communication port or interface 620 may be a part of the processor 602 or may be a separate component. The communication port 620 may be created in software or may be a physical connection in hardware. The communication port 620 may be configured to connect with a network 170, external media, the display 610, or any other components in system 600, or combinations thereof. The connection with the network 170 may be a physical connection, such as a wired Ethernet connection or may be established wirelessly as discussed below. Likewise, the additional connections with other components of the system 600 may be physical connections or may be established wirelessly. The network 170 may alternatively be directly connected to the bus 508.

While the computer-readable medium 622 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 622 may be non-transitory, and may be tangible.

The computer-readable medium 622 can include a solid-state memory such as a memory card or other package that houses one or more non-volatile read-only memories. The computer-readable medium 622 can be a random-access memory or other volatile re-writable memory. Additionally or alternatively, the computer-readable medium 622 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 600 may be connected to one or more networks 170. The network 170 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 170 may include wide area networks (WAN), such as the Internet, local area networks (LAN), campus area networks, metropolitan area networks, a direct connection such as through a Universal Serial Bus (USB) port, or any other networks that may allow for data communication. The network 170 may be configured to couple one computing device to another computing device to enable communication of data between the devices. The network 170 may generally be enabled to employ any form of machine-readable media for communicating information from one device to another. The network 170 may include communication methods by which information may travel between computing devices. The network 170 may be divided into sub-networks. The sub-networks may allow access to all of the other components connected thereto or the sub-networks may restrict access between the components. The network 170 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method for device movement-based authentication, comprising:

generating a notification in a user interface of a user device requesting a device movement-based signature to authenticate a user for an online service;

determining a starting check point to initiate a capture of device movement pattern and biometric data based on the notification prompting the user to provide the device movement-based signature, and activating a plurality of sensors of the user device based on the starting check point;

detecting the device movement pattern and the biometric data from the plurality of sensors of the user device, wherein the plurality of sensors include a direction sensor and an acceleration sensor to collect one or more motion signals during a device movement in a three-dimensional (3D) space, a vision sensor to collect face and fingerprint data of the user, and a global positioning system (GPS) sensor to collect longitude and latitude measurements;

normalizing the one or more motion signals received from the plurality of sensors to a predetermined size relative to each other;

determining acceleration, position, and orientation of the device movement pattern is within a predetermined threshold of a stored device movement-based signature based on the one or more motion signals and the longitude and latitude measurements, and the face and fingerprint data of the user matches stored biometric data, wherein the determining that the acceleration, the position, and the orientation of the device movement pattern is within the predetermined threshold of the stored device movement-based signature based on the one or more motion signals is performed by considering relative sizes of the one or more motion signals within the predetermined threshold;

authenticating the user to access a second user device for the online service; and determining an ending check point to halt the capture of the device movement pattern and the biometric data, and de-activating the plurality of sensors of the user device upon receiving a notification that the device movement pattern matches the stored device movement-based signature.

2. The method of claim 1, wherein each of the one or more motion signals comprises a time sequence of values captured by a corresponding sensor of the plurality of sensors at different times of the device movement pattern with the values ordered in a sequence.

3. The method of claim 1, wherein the one or more motion signals comprise vector displacement measurements in three dimensions received from an accelerometer of the user device.

4. The method of claim 1, wherein matching the device movement pattern with the stored device movement-based signature comprises:

comparing an average of the one or more motion signals with corresponding reference motion signals associated with the stored device movement-based signature.

5. The method of claim 1, wherein determining whether the determined device movement pattern matches the device movement signature is based on a machine learning model.

6. The method of claim 5, wherein the machine learning model has been trained using training data, wherein the training data comprises contextual data associated with one or more known genuine device movement-based signatures.

7. The method of claim 6, wherein the training data further comprises contextual data associated with one or more known forged device movement-based signatures.

8. The method of claim 1, wherein authenticating the user to access the second user device for the online service comprises:

transmitting an electronic transaction authorization request associated with the online service to a payment network via an acquirer processor server, wherein the electronic transaction authorization request comprises a transaction amount, a token associated with a primary account number, and a merchant identifier.

9. A system for device movement-based authentication, comprising:

one or more processors; and a non-transitory computer readable medium storing instructions which, when executed by the one or more processors, cause the one or more processors to perform a method comprising:

generating a notification in a user interface of a user device requesting a device movement-based signature to authenticate a user for an online service;

determining a starting check point to initiate a capture of device movement pattern and biometric data based on the notification prompting the user to provide the device movement-based signature, and activating a plurality of sensors of the user device based on the starting check point;

detecting the device movement pattern and the biometric data from the plurality of sensors of the user device, wherein the plurality of sensors include a direction sensor and an acceleration sensor to collect one or more motion signals during a device movement in a three-dimensional (3D) space, a vision sensor to collect face and fingerprint data of the user, and a global positioning system (GPS) sensor to collect longitude and latitude measurements;

normalizing the one or more motion signals received from the plurality of sensors to a predetermined size relative to each other;

determining acceleration, position, and orientation of the device movement pattern is within a predetermined threshold of a stored device movement-based signature based on the one or more motion signals and the longitude and latitude measurements, and the face and fingerprint data of the user matches stored biometric data, wherein the determining that the acceleration, the position, and the orientation of the device movement pattern is within the predetermined threshold of the stored device movement-based signature based on the one or more motion signals is performed by considering relative sizes of the one or more motion signals within the predetermined threshold;

authenticating the user to access a second user device for the online service; and determining an ending check point to halt the capture of the device movement pattern and the biometric data, and de-activating the plurality of sensors of the user device upon receiving a notification that the device movement pattern matches the stored device movement-based signature.

10. The system of claim 9, wherein each of the one or more motion signals comprises a time sequence of values captured by a corresponding sensor of the plurality of sensors at different times of the device movement pattern with the values ordered in a sequence.

11. The system of claim 9, wherein the one or more motion signals comprise vector displacement measurements in three dimensions received from an accelerometer of the user device.

12. The system of claim 9, wherein authenticating the user to access the second user device for the online service comprises:

transmitting an electronic transaction authorization request associated with the online service to a payment network via an acquirer processor server, wherein the electronic transaction authorization request comprises a transaction amount, a primary account number identifier, and a merchant identifier.

13. A non-transitory computer readable medium storing instructions that, when executed by one or more processors, cause the one or more processors to perform a method for device movement-based authentication, the method comprising:

generating a notification in a user interface of a user device requesting a device movement-based signature to authenticate a user for an online service;

determining a starting check point to initiate a capture of device movement pattern and biometric data based on the notification prompting the user to provide the device movement-based signature, and activating a plurality of sensors of the user device based on the starting check point;

detecting the device movement pattern and the biometric data from the plurality of sensors of the user device, wherein the plurality of sensors include a direction sensor and an acceleration sensor to collect one or more motion signals during a device movement in a three-dimensional (3D) space, a vision sensor to collect face and fingerprint data of the user, and a global positioning system (GPS) sensor to collect longitude and latitude measurements;

normalizing the one or more motion signals received from the plurality of sensors to a predetermined size relative to each other;

determining acceleration, position, and orientation of the device movement pattern is within a predetermined threshold of a stored device movement-based signature based on the one or more motion signals and the longitude and latitude measurements, and the face and fingerprint data of the user matches stored biometric data, wherein the determining that the acceleration, the position, and the orientation of the device movement pattern is within the predetermined threshold of the stored device movement-based signature based on the one or more motion signals is performed by considering relative sizes of the one or more motion signals within the predetermined threshold;

authenticating the user to access a second user device for the online service; and determining an ending check point to halt the capture of the device movement pattern and the biometric data, and de-activating the plurality of sensors of the user device upon receiving a notification that the device movement pattern matches the stored device movement-based signature.

14. The non-transitory computer readable medium of claim 13, wherein each of the one or more motion signals comprises a time sequence of values captured by a corresponding sensor of the plurality of sensors at different times of the device movement pattern with the values ordered in a sequence.

15. The non-transitory computer readable medium of claim 14, wherein matching the device movement pattern with the stored device movement-based signature comprises:

comparing an average of the one or more motion signals with corresponding reference motion signals associated with the stored device movement-based signature.

16. The non-transitory computer readable medium of claim 13, wherein determining whether the determined device movement pattern matches the device movement signature is based on a machine learning model.

17. The method of claim 1, wherein the plurality of sensors track the position, acceleration, and orientation of the device movement pattern, and wherein the device movement include moving, turning, and rotating the user device in the 3D space.

18. The method of claim 1, further comprising:

associating the determined device movement pattern to one or more rules, wherein the one or more rules include a requirement for a minimum number of device movement, a requirement for a minimum number of different types of movements, a requirement for a minimum duration of device movement, or a combination thereof.

19. The method of claim 1, further comprising:

analyzing a data set associated with a genuine device movement-based signatures;

averaging motions signals associated with the genuine device movement-based signatures to determine a representative device movement-based signature; and storing the representative device movement-based signature in a database for validating the device movement pattern.

* * * * *